United States Patent
Liebowitz et al.

(10) Patent No.: US 12,028,376 B2
(45) Date of Patent: Jul. 2, 2024

(54) SYSTEMS AND METHODS FOR CREATION, MANAGEMENT, AND STORAGE OF HONEYRECORDS

(71) Applicant: Penten Pty Ltd, Braddon (AU)

(72) Inventors: David Liebowitz, Bruce (AU); Ben Whitham, Campbell (AU); Bryn Evans, Cheltenham (GB); Kiriya Keat, Narrabundah (AU); Sam Moore, Abbotsford (AU)

(73) Assignee: Penten Pty Ltd, Braddon (AU)

( * ) Notice: Subject to any disclaimer, the term of this patent is extended or adjusted under 35 U.S.C. 154(b) by 614 days.

(21) Appl. No.: 17/169,405

(22) Filed: Feb. 6, 2021

(65) Prior Publication Data
US 2022/0255962 A1   Aug. 11, 2022

(51) Int. Cl.
*H04L 29/06* (2006.01)
*G06F 16/22* (2019.01)
(Continued)

(52) U.S. Cl.
CPC ...... *H04L 63/1491* (2013.01); *G06F 16/2282* (2019.01); *G06F 16/2358* (2019.01); *G06F 16/2457* (2019.01); *H04L 63/10* (2013.01)

(58) Field of Classification Search
None
See application file for complete search history.

(56) References Cited

U.S. PATENT DOCUMENTS 9,501,639 B2    11/2016  Stolfo et al.
10,515,214 B1 *  12/2019  Vincent ................. G06F 21/562
(Continued)

OTHER PUBLICATIONS

Abay, N., et al., "Using Deep Leaning to Generate Relational HoneyData," ResearchGate, Dec. 2018 (17 pages).
(Continued)

*Primary Examiner* — Harunur Rashid
(74) *Attorney, Agent, or Firm* — Nutter McClennen & Fish LLP

(57) ABSTRACT

The present disclosure is directed to systems and methods for creating, managing, and storing synthetic data that is designed to be placed within databases having real data to deceive, attract, detect and/or track unauthorized access thereof. The synthetic data can be stored as a honeyrecord in a database table that is interspersed with real data such that the honeyrecord is indistinguishable from real data or combined to form a honeytable having multiple honeyrecords therein. In some embodiments, the synthetic data can be used to create a user persona having one or more parameters to construct a profile or an identity honeyrecord of an individual. The parameters can include private information such as name, sex, passport number, social security number, bank account or credit card details, biometric details, passwords, and other information that is attractive to hackers and other data thieves. Creation of the honeyrecord can be performed without referencing any aspect of real data that is stored within the database, knowledge of the real data, or access to the database. Once created, the system can monitor the honeyrecords for release in online sources or for other forms of interaction, which can indicate that a breach took place.

17 Claims, 8 Drawing Sheets

(51) Int. Cl.
*G06F 16/23* (2019.01)
*G06F 16/2457* (2019.01)
*H04L 9/40* (2022.01)

(56) References Cited

U.S. PATENT DOCUMENTS

| | | | |
|---|---|---|---|
| 10,574,698 B1* | 2/2020 | Sharifi Mehr | H04L 63/1491 |
| 10,686,836 B1 | 6/2020 | Stolfo | |
| 11,144,656 B1* | 10/2021 | Banerjee | G06F 21/568 |
| 2009/0249082 A1 | 10/2009 | Mattsson | |
| 2010/0269175 A1 | 10/2010 | Stolfo et al. | |
| 2012/0246724 A1 | 9/2012 | Sheymov et al. | |
| 2015/0302218 A1 | 10/2015 | Fielder | |
| 2016/0180087 A1 | 6/2016 | Edwards et al. | |
| 2016/0379289 A1 | 12/2016 | More | |
| 2017/0104785 A1 | 4/2017 | Stolfo et al. | |
| 2018/0324213 A1* | 11/2018 | Borlick | G06Q 20/227 |
| 2019/0034083 A1 | 1/2019 | Cherubini et al. | |
| 2019/0052675 A1 | 2/2019 | Krebs | |
| 2019/0098032 A1* | 3/2019 | Murphey | G06F 9/4498 |
| 2019/0190951 A1 | 6/2019 | Myron et al. | |
| 2020/0050773 A1* | 2/2020 | Schroeder | H04L 63/1416 |
| 2020/0053120 A1* | 2/2020 | Wilcox | G06Q 10/107 |
| 2020/0204590 A1 | 6/2020 | Whitham et al. | |
| 2021/0067552 A1* | 3/2021 | Hebert | H04L 63/1416 |
| 2021/0314356 A1 | 10/2021 | Whitham et al. | |
| 2022/0004532 A1* | 1/2022 | Portisch | G06F 16/2282 |
| 2022/0286478 A1 | 9/2022 | Whitham et al. | |

OTHER PUBLICATIONS

Bowen, et al., "Baiting inside attackers using decoy documents" 5th International ICST Conference, SecureComm 2009, Athens, Greece; Sep. 2009 https://www.cs.columbia.edu/-amzelos/Papers/2009/DecoyDocumentsSECCOM09.pdf, 10 pages.

EP 19202330.7, Extended European Search Report dated Feb. 21, 2020, 8 pages—English.

Voris, et al., "Bait and Snitch: Defending Computer Systems with Decoys" Proceedings of the cyber infrastructure protection conference, Strategic Studies Institute; Sep. 2013.

Voris, et al., "Fox in the Trap: Thwarting Masqueraders via Automated Decoy Document Deployment" Presented at the European Workshop on System Security (EuroSec); Jul. 14, 2015. http://ids.cs.columbia.edu/sites/default/files/eurosec,_15_0.pdf, 7 pages.

Voris, et al., "Lost in Translation: Improving Decoy Documents via Automated Translation" IEEE CS Security and Privacy Workshops: SPW 2012: Proceedings: San Francisco, California, USA; May 24, 2012 https://ieeexplore.ieee.org/document/6227696, pp. 129-133.

Whitman, "Automating the generation of enticing text content for high-interaction honeyfiles." In Proceedings of the 50th Hawaii International Conference on System Sciences; Jan. 1, 2017, pp. 6069-6078.

Whitman, "Automating the Generation of Fake Documents to Detect Network Intruders" International Journal of Cyber-Security and Digital Forensics, vol. 2, No. 1, 2013, p. 103-118.

Whitman, "Canary Files: Generating Fake Files to Detect Critical Data Loss From Complex Computer Networks" in Conference: The Second International Conference on Cyber Security, Cyber Peacefare and Digital Forensic (CyberSec2013); Mar. 2013 https://pdfs.semanticscholar.org/daf9/875773176e8527381634616b2ad1be75aaf9.pdf, pp. 1-5.

Yuill, et al., "Honeyfiles: Deceptive Files for Intrusion Detection" In Proceedings of the 2004 IEEE Workshop on Information Assurance, U.S. Military Academy, West Point, NY; Jun. 2004. https://calhoun.nps.edu/handle/10945/37180, 7 pages.

* cited by examiner

| First Name | Last Name | Date of Birth | Email Address | Number of Dependents | Occupation |
|---|---|---|---|---|---|
| John | Smith | 1/4/1967 | john_smith@aol.com | 2 | Engineer |
| Dan | Jones | 1/1/1980 | Dan.jones@gmail.com | 3 | Attorney |
| Carol | Hoover | 2/6/1951 | carol123@gmail.com | 0 | Scientist |
| Karen | Johnson | 12/25/1996 | kj123@hotmail.com | 0 | Student |
| Bob | Brown | 10/14/1995 | comicbookfan@gmail.com | 4 | Doctoral fellow |
| Gloria | Smith | 6/7/1989 | hiitsgloria@outlook.com | 1 | Product Manager |

*FIG. 5A*

| First Name | Last Name | Date of Birth | Email Address | Number of Dependents | Occupation |
|---|---|---|---|---|---|
| John | Smith | 1/4/1967* | Dan.jones@gmail.com* | 2 | Engineer |
| Dan | Jones | 1/4/1967* | dj7181@outlook.com | 3 | Attorney |
| Carol | Hoover | 2/6/1951 | carol123@gmail.com | 0 | Scientist |
| Karen | Johnson | 12/25/1996 | kj123@hotmail.com | 0 | Student |
| Bob | Brown | 10/14/1995 | comicbookfan@gmail.com | 75* | Doctoral fellow |
| Michael* | Jordan* | 12/4/1990* | mj23@jumpman.com* | 3* | retired athlete* |

*FIG. 5B*

| First Name | Last Name | Date of Birth | Email Address | Number of Dependents | Occupation |
|---|---|---|---|---|---|
| John | Smith* | 1/1/1980* | danjones@gmail.com* | 2 | Engineer |
| Dan* | Jones* | 1/4/1967* | | 3 | Attorney* |
| Carol | Hoover | 2/6/1951 | carol123@gmail.com | 0 | Scientist |
| Karen | Johnson | 12/25/1996 | kj123@hotmail.com | 0 | Student |
| Bob | Brown | 10/14/1995 | comicbookfan@gmail.com | 4 | Doctoral fellow |
| Gloria | Smith | 6/7/1989 | hiitsgloria@outlook.com | 1 | Product Manager |

*FIG. 5C*

SYSTEMS AND METHODS FOR CREATION, MANAGEMENT, AND STORAGE OF HONEYRECORDS

FIELD

The present disclosure relates to systems and methods for creating, managing, and storing honeyrecords, and more particularly relates to creating, managing, and storing synthetic data that is designed to be placed within databases to deceive, attract, detect and/or track unauthorized access thereof.

BACKGROUND

Data theft and unauthorized access to information is a global challenge which continues unabated, posing significant threats to organizations and individuals: According to the IT-Harvest Breach Level Index, as well as the Open Security Foundation and the Privacy Rights Clearinghouse, 9 billion data records have been lost between 2013 and mid-2017, which equates to the loss of over 5 million records a day, or over 222,000 an hour and nearly 4 thousand every, minute. Field research has also revealed that data breach costs an organization more than US$3.6 m per incident, averaging around $141 per record. While the principal cost of data loss is the value of the information itself, most companies also experience indirect reputational and opportunity costs associated with a breach incident, often attributed to diminished trust or confidence from present and future customers. Many companies also face significant expenses associated with legal actions from customers and partners seeking compensation, or from lawsuits that arise due to lack of compliance with regulatory standards. Stolen or released data can also contain information that can be personally damaging to individuals and companies alike.

Many modern organizations rely on two key forms of data management to store information vital to their business operations: (1) tabular and database records, and (2) document management systems/file systems. Database information can contain anything from private customer information, organization financial transactions or product or parts inventories. Subsequently, the databases or tables that contain this information have become high value targets for internal and external data thieves. Motivations for these threats to steal this information includes, the desire to profit by selling the information to cyber criminals, notoriety, or to cause disruption and financial loss to the organization. Data loss can also come from party suppliers and internal engineers, who may be negligent in the handling of the organization's data.

Understanding whether an organization's data has been stolen and released or published outside of the organization can be a difficult process. A recent study highlights this issue, indicating that on average, it takes 200 days for an organization to realize that they have been the victim of a data theft or other cyber-attack. This extended period before identification often increases the seriousness of the breach, as the earlier the data theft or data release can be identified, the easier it is to manage and understand or mitigate the impact of that release. Unfortunately, most current data loss solutions are focused on detection inside the organization, predominantly upon the communications network used to transfer or access the data, with very little effort being placed outside the organization to discover if the data has been posted or exchanged online. Additionally, when a data breach is detected, the location and timing of the breach are often unclear in the event that the same data is stored across multiple entities within an organization.

Accordingly, there is a need to create an improved system for monitoring data that can quickly and efficiently detect the occurrence of a data breach while also providing information about the time and location of the breach.

SUMMARY

The systems and methods provided for in the present disclosure are directed to creation, management, and storage of synthetic data that is designed to be placed within databases having real data to deceive, attract, detect and/or track unauthorized access thereof. The synthetic data set can be used to create a user persona having one or more parameters to construct a profile or an identity honeyrecord of an individual. The parameters can include private information such as name, sex, passport number, social security number, bank account or credit card details, biometric details, passwords, and other information that is attractive to hackers and other data thieves. The synthetic data can be stored as a honeyrecord in a database table that is interspersed with real data such that the honeyrecord is indistinguishable from real data. In some embodiments, the synthetic data can be inserted into a honeytable having multiple honeyrecords. Creation of the synthetic data can be performed without referencing any aspect of real data that is stored within the database, knowledge of the real data, or access to the database. Once the honeyrecord and/or honeytable are stolen, the presence and/or detection of the honeyrecord and/or honeytable in an unauthorized location, e.g., on the internet, on a memory device, or on the black market, can signal that an intrusion has taken place and/or data has been stolen or misused. Moreover, attempts to use the information contained within a honeyrecord can also signal the occurrence of a data breach.

One exemplary embodiment of a system for creation of one or more honeyrecords includes a server; a user portal; a target database having one or more real data sets that are attributed to a user identity stored thereon; and a honeytoken content generator that is configured to: generate a synthetic data set at a predetermined time interval, the synthetic data set having one or more of a combination of parameters from the real data set, or one or more parameters that resemble parameters of the real data set, the synthetic data set being unattributable to a user identity; and deliver the synthetic data set to the database to be stored thereon, the synthetic data set being stored in a common location with the real data set. The parameters of the synthetic data set can include a user persona having one or more of a name, a sex, a date of birth, an email address, a telephone number, an employer, a job, a title, a physical address, a salary, a driver's license, a passport, a social security number, a login, bank account or credit card details, a photo or image or a virtual avatar, biometric details or a password, and the synthetic data set is created without referencing an aspect of the one or more real data sets stored on the database.

The synthetic data set can be created without access or visibility into the database. In some embodiments, the synthetic data set can be created without user input. Each parameter of the user persona in the synthetic data set can be internally consistent with each other parameter in the synthetic data set.

The content generator can create the synthetic data set automatically at the predetermined time interval. The synthetic data set stored at the common location can, in some embodiments, be indistinguishable from the real data set stored at the common location. The common location can be an existing target table within a database having the synthetic data and the one or more real data sets interspersed therein. In some embodiments, the common location can include a series of rows that create a honeytable having the synthetic data stored therein. Each parameter in a row of the honeytable can display data that is consistent with at least one other parameter in the row of the honeytable. In some embodiments, each parameter in a row of the honeytable can display data that is consistent with every other parameter in the row of the honeytable. Alternatively, in some embodiments, the parameters of the user persona in the synthetic data set can be inconsistent throughout the honeyrecord. The content generator can also be configured to insert one or more credential mechanisms into the synthetic data set such that the credential mechanisms can provide data about theft and/or misuse of the synthetic data set.

The honeytoken content generator can generate the synthetic data set in response to a honeyrecord request from the user portal. The user portal can modify the parameters of the honeyrecord request sent from the user portal to determine the parameters of the synthetic data set. In some embodiments, the user portal can be configured to modify the parameters of the synthetic data set created by the content generator.

Another exemplary embodiment of a system for creation of one or more honeyrecords includes a server; a portal; a target database having one or more real data sets that are attributed to a user identity stored thereon; and a honeytoken content generator that is configured generate a synthetic data set at a predetermined time interval, the synthetic data set having one or more of a combination of parameters from the real data set, or one or more parameters that resemble parameters of the real data set, the synthetic data set being unattributable to a user identity; and deliver the synthetic data set to the database to be stored thereon, the synthetic data set being stored in a common location with the real data set. The parameters of the synthetic data set can include a user persona having one or more of a name, a sex, a date of birth, an email address, a telephone number, an employer, a job, a title, a physical address, a salary, a driver's license, a passport, a social security number, a login, bank account or credit card details, a photo or image or a virtual avatar, biometric details or a password, and the synthetic data set can be created based on one or more database schema without referencing an aspect of the one or more real data sets.

The one or more database schema can include column names or data types. The synthetic data set can be created without access or visibility into the database. In some embodiments, the synthetic data set created by the content generator can be based on the real data set. Additionally, one or more database schema can be chosen from a pre-generated parameter list on the portal.

BRIEF DESCRIPTION OF DRAWINGS

This disclosure will be more fully understood from the following detailed description taken in conjunction with the accompanying drawings, in which:

FIG. 5A is an exemplary embodiment of a database table having a consistent honeyrecord stored therein FIG. 5B is an exemplary embodiment of a database table in which a plurality of honeyrecords are internally inconsistent;

FIG. 5C is an exemplary embodiment of a database table in which a plurality of honeyrecords are inconsistent with a database schema, e.g., columns of the database table;

DETAILED DESCRIPTION

Figure 1:
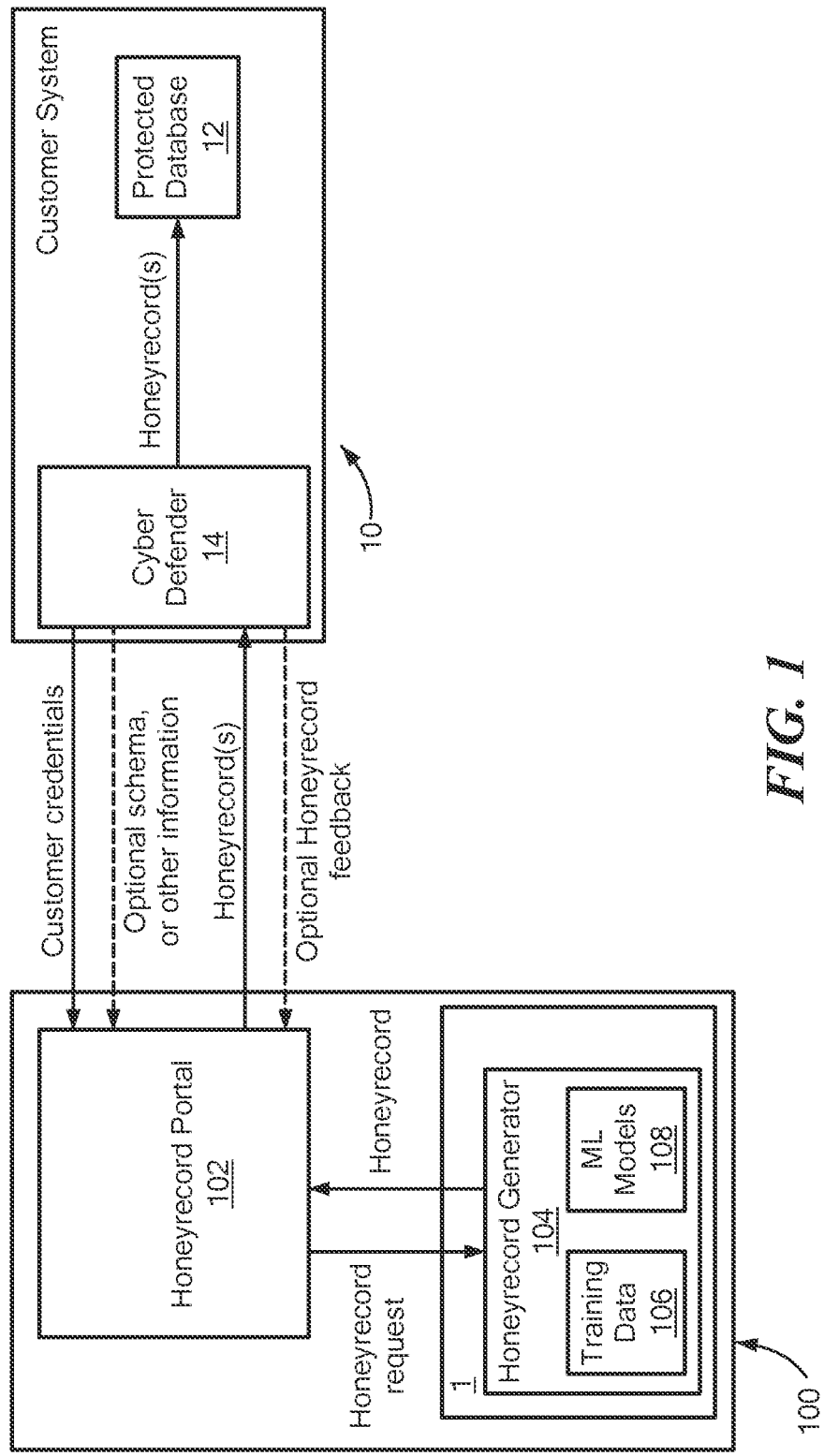
FIG. 1 is a schematic diagram of an exemplary embodiment of a system capable of deploying a honeyrecord in a customer system.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

As used in this description and the accompanying claims, the following terms shall have the meanings indicated, unless the context otherwise requires or makes clear a different meaning:

Honeypot: a security resource whose value lies in being probed, attacked or compromised.

Honeytoken: a digital or information system resource, e.g., a credit card number, Excel spreadsheet, PowerPoint presentation, a database entry, or fake login, whose value lies in the unauthorized use of that resource.

Honeyfile: a honeytoken in the form of a computer file, e.g., a document, spreadsheet, logfile, image, or any other type of file stored on a computer.

Honeyrecord: a honeytoken that contains a set of digital data elements, which may be of different types, that can fill at least a portion of a row of a table.

Honeytable: a sequence of honeyrecords that can be part of a database, a table in a spreadsheet, or in another honeyfile.

Blind honeyrecord: a honeyrecord created for the purpose of inclusion in a table without access to the full table data, with granted access being limited to table metadata, e.g., column names only, column names and data types, or information about the purpose of the table.

Consistent honeyrecord: a honeyrecord that has elements that are internally consistent, e.g., the elements are plausibly consistent with one another.

Identity or ID honeyrecord: a consistent honeyrecord describing aspects of the identity of a person. ID honeyrecords can be created with demographic parameters that do not require access to real records and can be developed and proposed for inclusion as blind honeyrecords in many real-world databases.

Composite honeyrecord: a honeyrecord that includes a mix of real and synthetic data.

Adopted honeyrecord: a real, non-synthetic set of data fields that are used as a honeyrecord, either in their original context or elsewhere.

Further, to the extent features, sides, or steps are described as being "first" or "second," such numerical ordering is generally arbitrary, and thus such numbering can be interchangeable. Still further, in the present disclosure, like-numbered components of various embodiments generally have similar features when those components are of a similar nature and/or serve a similar purpose. Lastly, the present disclosure includes some illustrations and descriptions that include prototypes or bench models. A person skilled in the art will recognize how to rely upon the present disclosure to integrate the techniques, systems, and methods provided for into a product in view of the present disclosures.

The present disclosure generally relates to systems and methods for creation, management, and storage of synthetic, or fake, data that is designed to be stored within databases that store real data to deceive, attract, detect and/or track unauthorized access thereof. Modern organizations are reliant on tabular and database records to store information that is vital to their business operations. Specifically, the systems and methods discussed herein can facilitate the generation of simulated or synthetic data that can be used to more readily identify whether that data has subsequently been released, interacted with or published without proper consent. This synthetic data, or honeypot, can be made up of various parameters whose value stems from the apparent usefulness of the data it communicates, as well as the unauthorized access and use of these parameters. The parameters of the present embodiments can be accumulated and arranged to form one or more honeyrecords that are stored in databases along with real data, with the honeyrecords being substantially or entirely indistinguishable from the real data stored therein. In some embodiments, the honeyrecords can be grouped and stored in a honeytable which resembles a database table but is made up of largely synthetic data.

FIG. 1 illustrates an exemplary embodiment of a system 100 for creation and deployment of honeyrecords in communication with a customer system 10. The system 100 can create one or more synthetic data sets for storage in the customer system 10 for protecting customer data stored therein. The synthetic data set created by the system 100 can include one or more of honeyrecords, blind honeyrecords, honeytables, consistent honeyrecords, ID honeyrecords, and/or composite honeyrecords, among others. Once stored therein, the synthetic data sets can be monitored and/or searched by the system 100, with detection of the synthetic data serving as a warning that an intrusion of the customer system 10 occurred and/or customer data has been stolen, as explained in greater detail below.

The customer system 10 can include a database 12 and a cyber defender 14 for communication with the system 100. A person skilled in the art will recognize that the database 12 can include a memory source, such as random access memory (RAM), thereon and may also include secondary memory (not shown). The memory source may be embodied as any type of device or devices configured for short-term or long-term storage of data such as, for example, memory devices and circuits, memory cards, hard disk drives, solid-state drives, or other data storage devices. Similarly, the memory may be embodied as any type of volatile or non-volatile memory or data storage capable of performing the functions described herein.

The database 12 can have one or more data types stored thereon. For example, the database 12 can serve as a central repository of data for a client or company, housing private and/or confidential information thereon, such as client contacts, blueprints, national security information, and so forth, that requires protection from hackers and other data threats.

In some embodiments, the real data sets stored on the database 12 can be that of user profiles. That is, the database 12 can store tabular records that store parameters of personal data that can be used to identify individuals, e.g., names, addresses, phone numbers, and other private information. In such tabular records, each of first name, last name, address, phone number, and other identifying parameters are listed in a column of the table and the corresponding info for each individual, or client, make up a list of individuals that are tabulated within the rows of the table. Some non-limiting examples of additional parameters that can be tabulated can include sex, date of birth, email address, employer, job, title, salary, driver's license, passport, social security number, login, bank account or credit card details, a photo or image or a virtual avatar, biometric details or password information. The data for each of these parameters can fill a cell of a table stored in the database 12 at an intersection of a row that is attributed to a particular individual and a column in which parameters of that type are listed for each individual. These parameters are very valuable to companies as they can be used to identify prospective customers, make sales, chart demographics, and so forth. For these reasons, the more parameters that are known about each individual, the more complete and valuable each particular user profile is.

These tabular records can be stored in a plurality of locations within the system 10. For example, a person skilled in the art will recognize that the database 12 can store one or more copies of these tables to allow for easy access as well as backups to prevent inadvertent deletion or overwriting of data.

The database 12 can also be configured to have synthetic data stored thereon. Synthetic data can be stored at these locations and monitored to prevent unauthorized access. As mentioned above, the database 12 can have a plurality of database tables having a number of rows and/or columns. One or more of said tables can be manipulated to include one or more rows of synthetic data, or honeyrecords, therein, as shown below. The honeyrecords can be added by overwriting an expired row of parameters, adding a new row to the table at the beginning, middle or end of the table, and/or copying an existing table while inserting the honeyrecord into a row of said table. In some embodiments, a plurality of honeyrecords can be combined to form a honeytable that is composed of rows of honeyrecords. Displaying the honeyrecord in the database table and as a honeytable are discussed in greater detail below.

In some embodiments, the customer system 10 can include a cyber defender 14. The cyber defender 14 can analyze the synthetic data set created by the system 100 and store the synthetic data set within the database 12. It will be appreciated that while the cyber defender can be a software, in some embodiments, the cyber defender 14 can be a system administrator or a third party service provider that manually selects a location in the database 12 for storing the synthetic data set.

As shown in FIG. 1, the system 100 for generating honeyrecords can include a portal 102 and a content generator 104. The portal 102 can include one or more API's to facilitate information transfer and may also have a dedicated user interface through which users interact with the system 100 and its functionalities. Through the portal 102, users can both obtain information needed to undertake creation of the synthetic data set and provide the content generator 104 with the criteria needed for creation of the honeyrecord. For example, in some embodiments, users can access the portal 102 and optionally provide real data, such as database schemas, document templates or suggested content, which are then passed to the content generator 104 for honeyrecord creation. This real data can be stored in a training repository 106 of the content generator, as discussed further below. In some embodiments, the portal 102 can also be used to review the synthetic data set that was created by the content generator 102 and provide feedback and/or make selections of specific parameters to be included and excluded from the honeyrecord.

Access and control of the portal 102 can be regulated using a username/password combination, dual-factor authentication, or another method of authentication to track and monitor user access thereto. In some embodiments, the portal 102 can be used for generation and retrieval of the system activity logs which are stored in system logs (not shown). The portal 102 can also serve as the conduit through which partners and eventually clients gain access to generated honeyrecords for deployment and search purposes. In some embodiments, the portal 102 can provide reporting and alerting information generated by the system 100. It will be appreciated that the portal may have push and pull functionality, which is dependent upon user needs and an implementation approach preferred and programmed by each user.

The synthetic data can be used to create an identity honeyrecord or a user persona. The user persona can include personal, identifiable parameters about one or more users that resembles the records of user profiles being tabulated on the database. The synthetic data, which is camouflaged among the real data, is therefore being created for purposes of determining whether a hacker or another cyberthreat breached, stole, and/or misused the data from the database. The greater the resemblance between the synthetic data and the real data, the greater the likelihood that the cyberthreat will be unable to detect the presence of the synthetic data within the stolen data. For example, the user persona created by the content generator can include synthetic data for each of the parameters of the user profile, e.g., a name, a sex, a date of birth, an email address, a telephone number, an employer, a job, a title, a physical address, a salary, a driver's license, a passport, a social security number, a login, bank account or credit card details, a photo or image or a virtual avatar, biometric details or a password, as mentioned above. It will be appreciated that these parameters are merely exemplary and are in no way limiting of the type of parameters exemplified by the user persona. A person skilled in the art will recognize that the data can even be made to look more enticing than the real data with the addition of private information such as passport number, close personal contacts, and so forth. There are a variety of ways that the synthetic data can be made to resemble real data to minimize the likelihood that the synthetic data is identified as a honeyrecord by a threat, as described in greater detail below.

A user can access the portal 102 to initiate honeyrecord creation. Once a request for synthetic data is entered in the portal 102, a honeyrecord request is sent to the content generator 104. The honeyrecord request can include a command to generate synthetic data that can be assembled to form, for example, a blind honeyrecord. A blind honeyrecord is a honeyrecord that is created without access or information to the full table data that is stored in the database. For example, the portal 102 can request the content generator 104 to create one or more parameters of a user persona without providing schema about the real data contained in the database 12. That is, where client specific information is not provided, the content generator 104 can utilize similar or representative data to be used as the foundation of a model and parameter set. The model produced from the learning process includes a model of the record schema or record to be generated, and a set of parameters which drive that model. For example, as discussed above, the content generator 104 can infer values for demographic parameters of synthetic data that do not require access to real records, but are rather based on external factors, by using machine learning and natural language processing techniques. Some non-limiting examples of such model can include historical synthetic data trends, artificial intelligence (AI) that infers results based on publicly available information, e.g., the specialization of the company, as discussed above, random number generation, and data interpolation.

For example, a request for creation of a blind honeyrecord can include access being limited to table metadata, e.g., column names only, column names and data types, or information about the purpose of the table, without disclosing the full schema of their records. Alternatively, or in addition, in some embodiments, no information is given about the table, the database, or the customer system 10. Having the ability to create the synthetic data without access to the database avoids the need to obtain client approval before implementing the presently disclosed system as client data is not being shared. Moreover, the system avoids having to navigate past onerous restrictions that are sometimes required in order to obtain clearance and/or access to data. Avoiding sharing data also puts clients at ease that their data is not being shared outside of a particular company, and greatly decreases legal liability of implementing the solution as no data is being transmitted, which decreases the risk of data theft or loss during transmission. For example, data of the geographical coordinates of customers of a certain business can allow the record generator to create a user persona having a fake address that is within a plausible radius of the business, thereby allowing the user persona better camouflage within the real data. In some embodiments, ages, nationalities, and income levels can be used to create an identity honeyrecord that is more reflective of the type of clients and/or consumers that frequent a specific business. The blind honeyrecord can then be sent to the portal 102 by the content generator as a superset that contains all of the synthetic data and allow a user to log on and select/deselect the parameters that they wish to be part of the honeyrecord.

Instances in which no information about the database is provided can occur in cases in which the data is strictly confidential, e.g., government, defense work, or other matters of national security, a prohibition against transmission of any data outside the company or to third party sources, and/or in the event that approval for data transmission is too time consuming and threat of theft is imminent, among others.

In some embodiments, the portal 102 can include pre-generated parameters that a user can pre-select to be included in the synthetic data. For example, in creating the user persona for being included in the identity honeyrecord, the user can specify that the synthetic data should include one or more of a name, a sex, a date of birth, an email address, a telephone number, an employer, a job, a title, a physical address, a salary, a driver's license, a passport, a social security number, a login, bank account or credit card details, a photo or image or a virtual avatar, biometric details or a password, as mentioned above. Once the desired parameters are selected, the portal 102 can send a honeyrecord request to the content generator 104 to create a honeyrecord having only the desired parameters. The identity honeyrecord can then be sent to the portal 102 by the content generator 104 for user review, feedback, and/or addition or deletion of certain parameters. It will be appreciated that addition/deletion of certain parameters can generate a new honeyrecord request that is completed by the content generator 104, which is then returned to the portal once completed for additional review prior to being sent to the customer system 10.

In some embodiments, the portal 102 can be used to customize synthetic data parameters by enabling users to specify certain rules for generation of honeyrecords. The portal 102 can have a customization interface which can be used to provide hints to the content generator 104 about the type of parameters or the values of these parameters. For example, in some embodiments, the user can request one or more special columns that are particular to their database. The special columns can have a relationship with other columns stored in the database or can have unique rules. For example, a user can specify that the special column is to have a specific number, e.g., eight or more, of alphanumeric characters with at least one capital letter, such as, for example, in the case of storage of client passwords. The portal 102 can send a honeyrecord request to the content generator 104 to create the special column, which can then be reviewed and altered in the portal in the manner described above.

In some embodiments, the content generator 104 can receive customer credentials and/or real data from the database 12 and create synthetic, or fake, data based on the real data set. While basing the synthetic data on real data differs from the process of creating blind honeyrecords when no real data is provided, the content generator 104 can also analyze existing real data when creating the synthetic data. For example, in the case of a client list, the content generator 104 can analyze the real data for names and addresses and generate synthetic data by randomizing the real data to create the identity honeyrecord. Alternatively, the content generator 104 can randomize the numbers in an address, phone number, or credit card number, to create the honeyrecord. Data that is tokenized can be used for watermarking or breach detection, and can include a fake address, a fake bank account, and/or a fake email account. The parameters can then be combined to create a honeyrecord of a user persona having said address, bank account or email account, in addition to such details as name, phone number, credit card number, social security number and so forth, all of which are synthetic data fields. In some embodiments, the content generator 104 can access a phone book, e.g., white pages, based on an average location of other users contained within the data of the database and create an identity honeyrecord of an individual that lives in a common area with the other users.

The content generator 104 can therefore enable rapid and efficient creation of realistic and uniquely identifiable database or tabular data for insertion into existing databases to identify breaches. When inserted into the database or table, this data will simulate real data entries but holds no production value. Rather, this synthetic data will enable traceability of that data when published in online sources following a hack or data breach, as described further below.

In some embodiments, the content generator 104 can insert a credential mechanism into the synthetic data as part of the honeyrecord. The credential mechanism can be a fake password or another credential that was created to be part of the honeyrecord that appears to grant access to a database, a server, or another component of the system, such as the portal 102 in FIG. 1. Unauthorized access using the credential mechanism can therefore be detected when someone attempts to access the portal using the fake password. Entry of the password will be indicative of malicious activity and signal that a breach may have occurred from an external source, or someone within the company.

The content generator 104 can create logs and other metadata regarding the generated honeyrecord, which can be transferred to the portal 102 as part of the honeyrecord. The logs can inform administrators the time of synthetic data creation, where the data was stored, and/or the type of data that was created. The honeyrecord can then be transmitted to system logs to catalog honeyrecord creation and package the generated honeyrecords in a format that can be ingested by the client user.

The content generator 104 can create the synthetic data in accordance with rules set by a user or the system 100. For example, in some embodiments, a time interval can be set to a given value at which new synthetic data is created. At the conclusion of the time interval, a user may be prompted to facilitate data creation or the creation can occur automatically. The time interval can be set at a scale of seconds, minutes, hours, days, weeks, months, and/or years. This time interval can be predetermined or randomly generated. A time interval can also be applied to retirement of honeyrecords. For example, the system can include a rule that stipulates honeyrecords are active for a given time period, e.g., three months, at which point they can be deleted and replaced by an alternate honeyrecord.

In alternate embodiments, the synthetic data can be created automatically, e.g., without user input. Traditionally, realistic and unique synthetic database content has been generated by using real data that is entered either manually or automatically. However, entering and obtaining this information can be a time-consuming process, especially with large databases and files. Data entry can also be prone to human error, if entered manually. Further, in the event that a process that governs data generation exists, it is possible that the created content will not be unique. Such manual approaches require the use of real, genuine data to create the entry, which can cause issues with sourcing that data and may incur data protection implications. Moreover, if this data is being sourced from another data repository, it is possible that this same data has been used elsewhere internally within the company, or even by a legitimate third party, which further increases the likelihood that the data used, and the fields entered, may not be unique. Subsequently, if large volumes of data are required, e.g., an entire database table, the effort required to generate and manage this data in a consistent and realistic manner can be immense. These issues often lead to the avoidance of the creation of large volumes of data in this manner, and exhibits the efficiency of automatic generation of synthetic data.

It will be appreciated that, in some embodiments, the content generator 104 can reside on a server 1 that is distinct from the portal 102. The honeyrecord server 1 is described in greater detail below. The content generator 104 can include the training repository 106 and machine learning models 108, each of which reside on the honeyrecord server 1 along with the content generator. The training repository 106 can store information about database schemas, templates, and other real data provided by the customer system 10 to the portal 102 that the system 100 uses to inform the content generator 104 about the parameters the user wants included in the synthetic data set. The machine learning models 108 can serve as the means by which any collected or provided data is analyzed, understood and modelled in order to generate honeyrecords. The machine learning models 108 can include machine learning algorithms and parameter sets combined with generation data to generate realistic record based honeytokens appropriate for an end user's environment. In some embodiments, the real data can be a sample of the data sets that are stored in the database, or data that is specifically passed to the content generator 104 to improve the machine learning capability of the system such that it creates synthetic data that mimics real data to an extent indistinguishable to would-be attackers. Running the real data through a machine learning algorithm can inform the content generator 104 about how to create synthetic data that appears more realistic.

As discussed above, in some embodiments, the content generator 104 can create synthetic data based on one or more database schema to determine the type of parameters needed for the synthetic data. Some non-limiting examples of database schema can include column names, data types, type of document in which the synthetic data is to be inserted, nature of the business, and so forth. In some embodiments, schema can be input into the system following a questionnaire or a survey that details the nature of the business and the type of tables and/or records for which parameters of synthetic data are to be created. Once received, the content generator 104 can create synthetic data containing parameters that corresponds to the particular database schema. For example, knowing that a column of a table should recite an "address" parameter of a clients for a bank, the content generator can create synthetic data containing an address parameter. When used in conjunction with the training data 106 and the machine learning models 108 discussed above, the synthetic data produces a parameter having an address that is within a certain radius of the bank such that it would be reasonable for individuals living at the address to be a customer of the bank. As another example, knowledge that columns of a table should list employee salary figures and positions held at a company, the content generator 104 can create synthetic data that lists a dollar figure in the salary column and a corresponding employee position to each salary that a company of that type would employ.

Once generated, the content generator 104 can deliver the honeyrecord to the portal 102. The user can choose to modify the honeyrecord by adding/removing parameters, changing the desired parameters, or restarting the process and generating a new honeyrecord request. After the user is satisfied with the content of the honeyrecord, the honeyrecord can be passed to the computer system 10 via the cyber defender 14 and stored in the database 12.

Figure 2B:
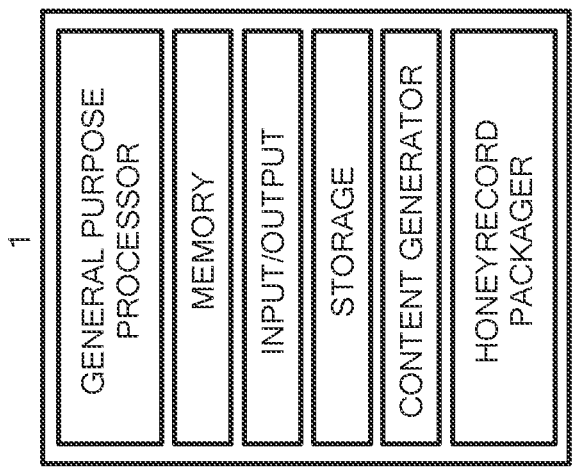
FIG. 2B is a schematic diagram of selected operations components of the server of FIG. 2A.
Figure 2A:
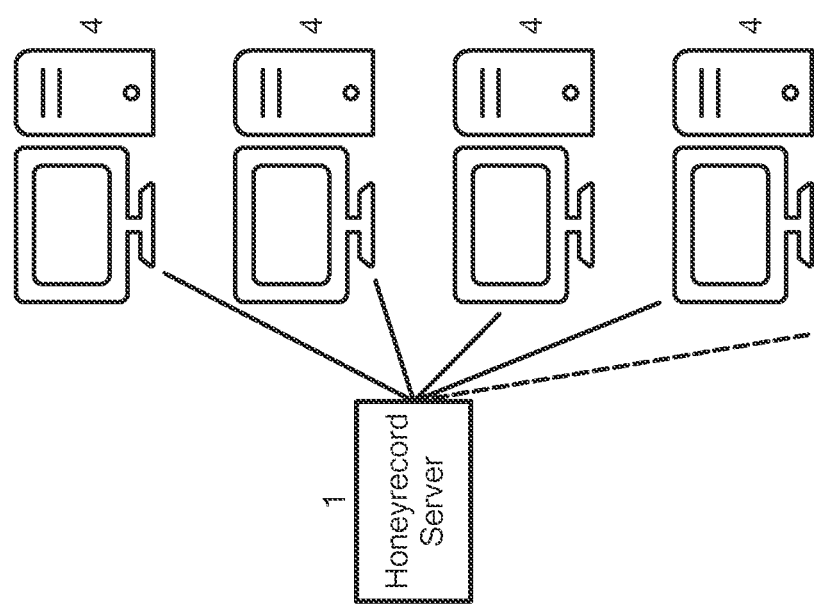
FIG. 2A is a schematic diagram of hardware components of an exemplary embodiment of a server used with the system of FIG. 1 for creating, deploying, and/or managing honeyrecords.

FIGS. 2A-2B illustrate the server 1 in greater detail. For example, FIG. 2B illustrates an exemplary embodiment of the honeyrecord server 1 that can be used with the system 100 described herein. In addition to the honeyrecord generator 104 residing thereon, the honeyrecord server 1 can include a processor, memory elements, storage, and input/output means for performing the steps of the method. In a preferred form, the server may comprise a Linux box, capable of operating software able to perform the steps of the method. The server 1 may be a virtual or a real server that is configured to execute the steps of the method disclosed herein.

In more detail, the honeyrecord server 1 can be connected to a plurality of designated user devices 4, as shown in FIG. 2A, with each device including a processor and user interface. The honeyrecord server 1 interacts with the user devices 4 via an electronic communications network, and accesses each of the user devices 4, including by receiving inputs on the user devices, after receiving instructions from one or more of the devices 4 to initiate a honeyrecord creation.

As mentioned above, the synthetic data set can stored in a common location with the real data such that the synthetic data set does not stand out relative to the real data to an intruder. The honeyrecord can be populated with the synthetic data automatically, while in some embodiments, the honeyrecord can be populated in response to a user prompt and/or another user-initiated activity.

Alternatively, the honeyrecord can be exported to the customer system 10 for storage thereon. For example, the honeyrecord can be exported as a script that a system administrator or another authorized user stores in a location, e.g., Microsoft SQL Server or another script, in the database 12 that is deemed to be most appropriate to contain the honeyrecord. A person skilled in the art will recognize that in some embodiments, variations of a given honeyrecord can be placed in each server and/or database of a multi-server, multi-database infrastructure. Once the honeyrecord is released and detected, the identity of the particular server or database that was compromised can be identified without having to shutdown the entire infrastructure to determine location of the breach.

Indeed, it should be noted that FIGS. 1 and 2 only schematically show each of these components. Those skilled in the art should understand that each of these components can be implemented in a variety of conventional manners, such as by using hardware, software, or a combination of hardware and software, across one or more other functional components. For example, one or more of the server and the database may be implemented using a plurality of microprocessors executing firmware. In some embodiments, the server may be implemented using one or more application specific integrated circuits (i.e., "ASICs") and related software, or a combination of ASICs, discrete electronic components (e.g., transistors), and microprocessors. Accordingly, the representation of the components within the system 100 and the customer system 10 in a series of boxes in FIGS. 1 and 2 is for simplicity purposes only. In fact, in some embodiments, the components of the figures can be distributed across a plurality of different machines—not necessarily within the same housing or chassis.

It should be reiterated that the representation of FIGS. 1 and 2 are a significantly simplified representation of an actual system. Those skilled in the art should understand that such a device has many other physical and functional components, such as central processing units, other packet processing modules, and short-term memory. Accordingly, this discussion is in no way intended to suggest that FIGS. 1 and 2 represents all of the elements of a system for creating honeyrecords.

Figure 3:
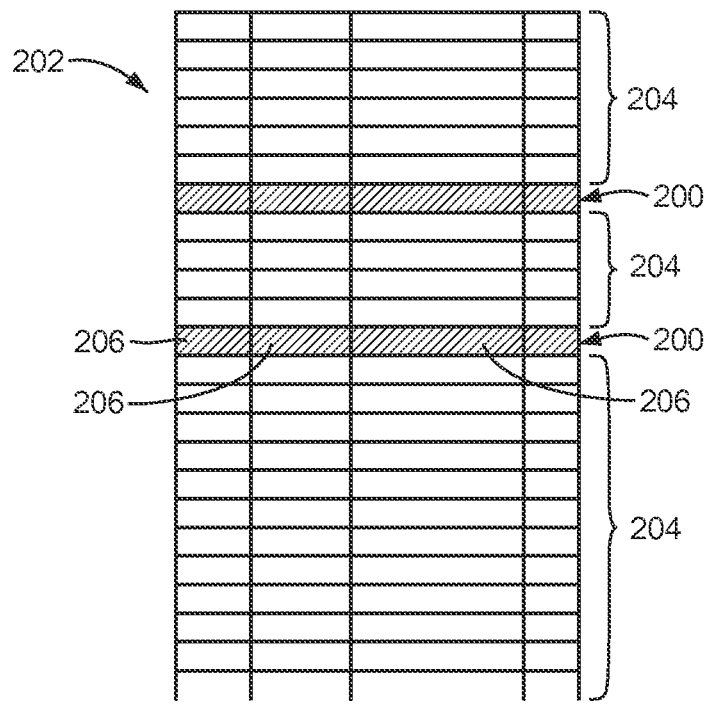
FIG. 3 is a schematic diagram of a database table having two honeyrecords therein.
Figure 4:
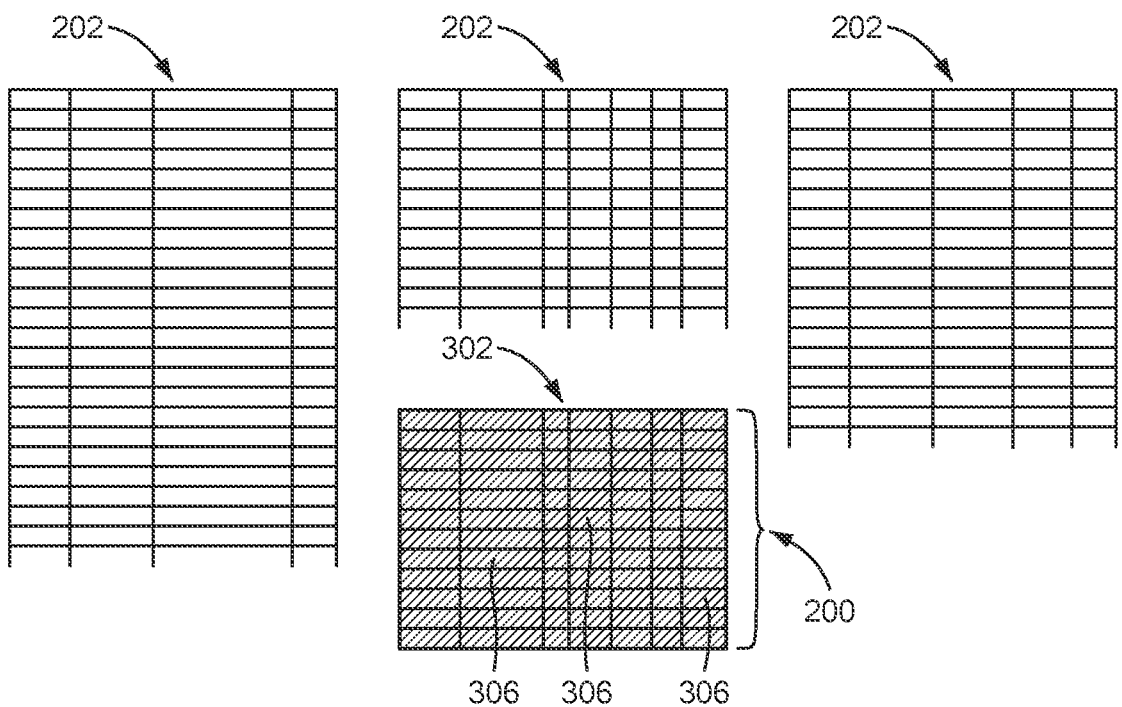
FIG. 4 is a schematic diagram of an exemplary embodiment of a honeytable stored in a location with a plurality of database tables.

Exemplary embodiments of storage of honeyrecords 200 within the database 12 are shown in FIGS. 3 and 4. As shown in FIG. 3, the common location can include a table 202 in the database 12 having rows of real data 204 with rows of honeyrecords 200 interspersed therein. Each cell 206 of the honeyrecord 200 can have a parameter stored therein. The rows of honeyrecords 200 can be separated by rows of real data records 204, as shown, thought in some embodiments, the honeyrecords 200 are displayed in consecutive rows.

In some embodiments, the synthetic data can be used to populate a table made up entirely of synthetic data, or a honeytable. An exemplary embodiment of a honeytable 302 capable of being stored in the database 12 is shown in FIG. 4. As shown, the honeytable 302 can include a series of rows and columns having a plurality of honeyrecords 200 arranged in rows having synthetic data stored therein. Generally, each parameter of the synthetic data can be stored at an intersection of a row and column, e.g., a cell 306 of the table, though, in some embodiments, multiple parameters can be stored in a single cell or some cells of the honeytable 302 can be left blank.

As shown, the honeytable 302 can be stored in a portion of the database 12 with the tables 202 of real data records 204. It will be appreciated that the synthetic data included in the honeyrecords 200 of the honeytable 302 is indistinguishable to one skilled in the art from the real data 204 in the tables 202 in the database 12 such that a potential thief of the database would steal both the real data tables 202 and the honeytable 302. While a honeytable 302 having seven columns is shown, a person skilled in the art will recognize that the honeytable 302 can have one to six columns, or eight or more columns. Moreover, the number of rows of the honeytable 302 can vary. Honeytables 302 having a greater the number of columns and/or rows can be more advantageous as the likelihood that a threat will parse the data and successfully determine the existence of the honeyrecord 302 decreases as the amount of data increases.

When the synthetic data is populated into the honeyrecord 200 and/or the honeytable 302, each parameter of the data is consistent throughout the honeyrecord 200 and/or the honeytable 302 such that each parameter is consistent with each other parameter of the honeyrecord 200 to create a consistent honeyrecord. For example, when creating a user persona, each parameter of the user persona in the synthetic data set is evaluated for consistency with each other parameter of the honeyrecord 200 and/or database table in the synthetic data set to create the consistent honeyrecord. In some embodiments, the honeyrecord 200 can include user data for first name, last name, date of birth, email address, and so on. A person skilled in the art will recognize that honeyrecords are most effective when they exhibit internal consistency, e.g., when the first and last name within the honeyrecord correlate to the email address or, at the very least, do not alert someone about an inconsistency, as inconsistencies can alert a potential thief about the parameters within the table being honeyrecords. For example, a first name of "John" and a last name of "Smith" having an email address of "Dan.jones@gmail.com" does not create a consistent honeyrecord as it presents an inconsistency within the data. Some non-limiting examples of inconsistencies within honeyrecords can include use of repetitive information, clear disagreement with respect to the parameters used, exorbitant values, and/or obvious errors are examples of such inconsistencies that can alert that the data is synthetic, fake, or acts as honeyrecord. A potential thief, when interacting with data having such inconsistencies, may be less likely to use, or even delete, this data, either believing it to be incorrect and therefore not useful or realize that the data was placed there for deceptive purposes. Data having such inconsistencies may minimize the chance of discovery and location of breach events that occur because a thief is less likely to use or release the data.

An example of a consistent honeyrecord within a table is shown in FIG. 5A. The table 202 includes parameters for "first name," "last name," "date of birth," "email address," "number of dependents," and "occupation." As shown, the table 202 includes five rows of real data 204 and a single honeyrecord 200 for Dan Jones. The honeyrecord 200, which is highlighted, is a consistent honeyrecord because the parameters are consistent with one another, e.g., the name matches the email address and it is plausible that a person that is 40 years old can have three dependents.

A table having several internal inconsistencies is provided in FIG. 5B, with inconsistencies being labeled with asterisks (*) for reference. As shown, the first row has an inconsistency between the name "John Smith" and the email address being to "dan.jones@gmail.com." While it may be possible that John Smith has this email address, the probability is low and seeing this discrepancy may make someone wary of this entry. Moreover, the first and second rows have the same date of birth listed. While two individuals may have the same date of birth, the probability of this is also very small and may raise some red flags. Additional examples of inconsistencies in this table 202 include Bob Brown having 75 dependents, and the entry of Michael Jordan, which not only lists his date of birth incorrectly but also is a famous figure whose data in the table 202 seems fabricated.

In some embodiments, consistencies of the parameters are evaluated within a column of the table 202 and/or the honeytable 302 in which the parameter is displayed rather than across a row thereof, as discussed above in FIG. 5B. For example, synthetic data entered into a table having columns labeled "first name," "last name" and "date of birth," respectively, is entered such that the parameter is consistent with the column heading, as shown in FIG. 5A. For consistent honeyrecords, an entry of "Dan," "Jones," and "01/01/1980" is entered into a table having these columns rather than "dan.jones@gmail.com," "01/01/1980," and "attorney," as the latter would create an inconsistency that would cause a greater likelihood that the honeyrecord is detected and/or never used, thereby decreasing the probability of the breach being detected by a system administrator. It will be appreciated that these column headings are simply exemplary, and database tables and honeytables can have a smaller or larger number of columns therein. An exemplary honeytable having such column inconsistencies are shown in FIG. 5C with inconsistencies being labeled with asterisks (*) for reference. As shown, the first and second rows display such inconsistencies as the parameters do not correspond to the columns of the table, and in the first row the synthetic data for "engineer" is repeated for the entry of "John Smith" in the column for "last name" as well as "occupation."

It will be appreciated that in some embodiments, one or more parameters of the synthetic data can be displayed in a manner that signals its being part of a honeyrecord. Such embodiments can allow for authorized users who are aware of the rules used to create synthetic data to distinguish the synthetic data in the honeyrecord from the real data to ensure that these legitimate users do not mistakenly interact with the honeyrecords. Some non-limiting examples of such inconsistencies can include inserting an email address parameter of the honeyrecord in brackets, having honeyrecords with first names that only start with a certain letter, e.g., the letter "Z," email addresses that have a specific domain, e.g., "@msn.com," and so forth. This type of syntax can allow the honeyrecords to be stored in the same location as the real data while minimizing risks of authorized users interacting with the honeyrecord and thereby triggering a false alarm of a breach. It will be appreciated that such implementation carries a risk of a threat being suspicious of the data and/or figuring out the naming convention of the synthetic data, causing them to delete the honeyrecords following a breach, thereby delaying or even eliminating administrators' awareness of the existence of the breach.

Figure 6:
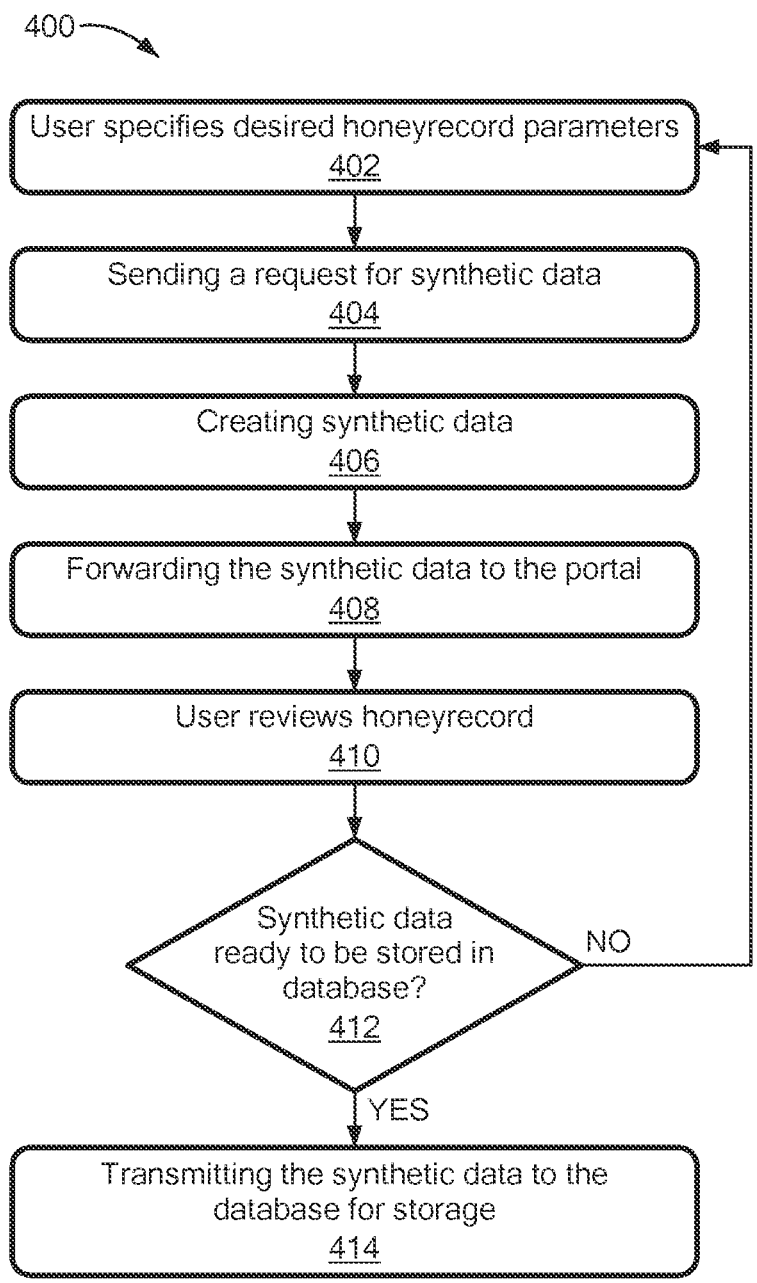
FIG. 6 is a process flow diagram for an exemplary embodiment of a process for creation of a honeyrecord.

FIG. 6 illustrates an exemplary flow diagram 400 for the process of honeyrecord creation by the presently disclosed system 100. The steps of honeyrecord creation can include using the portal 102 to specify desired honeyrecord parameters 402, sending a honeyrecord request to the content generator 104 for the creation of synthetic data 404, creating the synthetic data 406, forwarding the synthetic data to the portal 408, reviewing of the honeyrecord by the user 410, determining if the honeyrecord is ready to be stored in the database 412, and, if the honeyrecord is satisfactory, transmitting the synthetic data to the database for storage 414. Otherwise, if the honeyrecord needs to be modified, the process 400 returns to the user specifying the desired parameters for the honeyrecord 402 and the process repeats until the synthetic data is transmitted to the database.

As mentioned above, a user can access the portal 102 to request the parameters desired for the synthetic data. The portal 102 can be configured to set rules about honeyrecord generation. Once identified, a request for the synthetic data can be sent to the content generator 104. The request can contain no information about the real data, though, in some embodiments, one or more database schema can be included. It will be appreciated that the request can originate from the portal 102, or any other component of the system 100. The content generator 104 can utilize the training data 106 and/or the machine learning models 108 to create the synthetic data that will make up the honeyrecord. Once the synthetic data is created, it can be forwarded to the portal 102. In some embodiments, the portal 102 can be used to indicate whether the honeyrecord will be stored along with real data in a table or combined with other honeyrecords to form a honeytable. The user can access the portal 102 to review the synthetic data to determine if the data meets the desired criteria. If the synthetic data passes review without the need for modification, the portal 102 can then send the honeyrecord to the database 12 for storage at the common location. If review of the synthetic data detects errors or requires adjustment, adjustments can be made on the portal 102 and then a new honeyrecord request can be sent to the content generator 104 until the synthetic data passes review and possesses the desired criteria for storage on the database 12.

Once the honeyrecords are saved to the database 12, the system 100 can monitor the honeyrecords for release in online sources or interaction therewith. The honeyrecords serve as a watermark in the event that a data thief obtains one or more of the database, the table which contains the honeyrecord, and/or the honeytable, as the data thief will be unable to distinguish between the real and synthetic data entry. Subsequently, if the data is published or otherwise released outside of the system, one or more features of the system, or a third party source, can identify this release, and alert the client that a breach took place, as well as identify the location and/or time of the breach, as described further below.

Figure 7A:
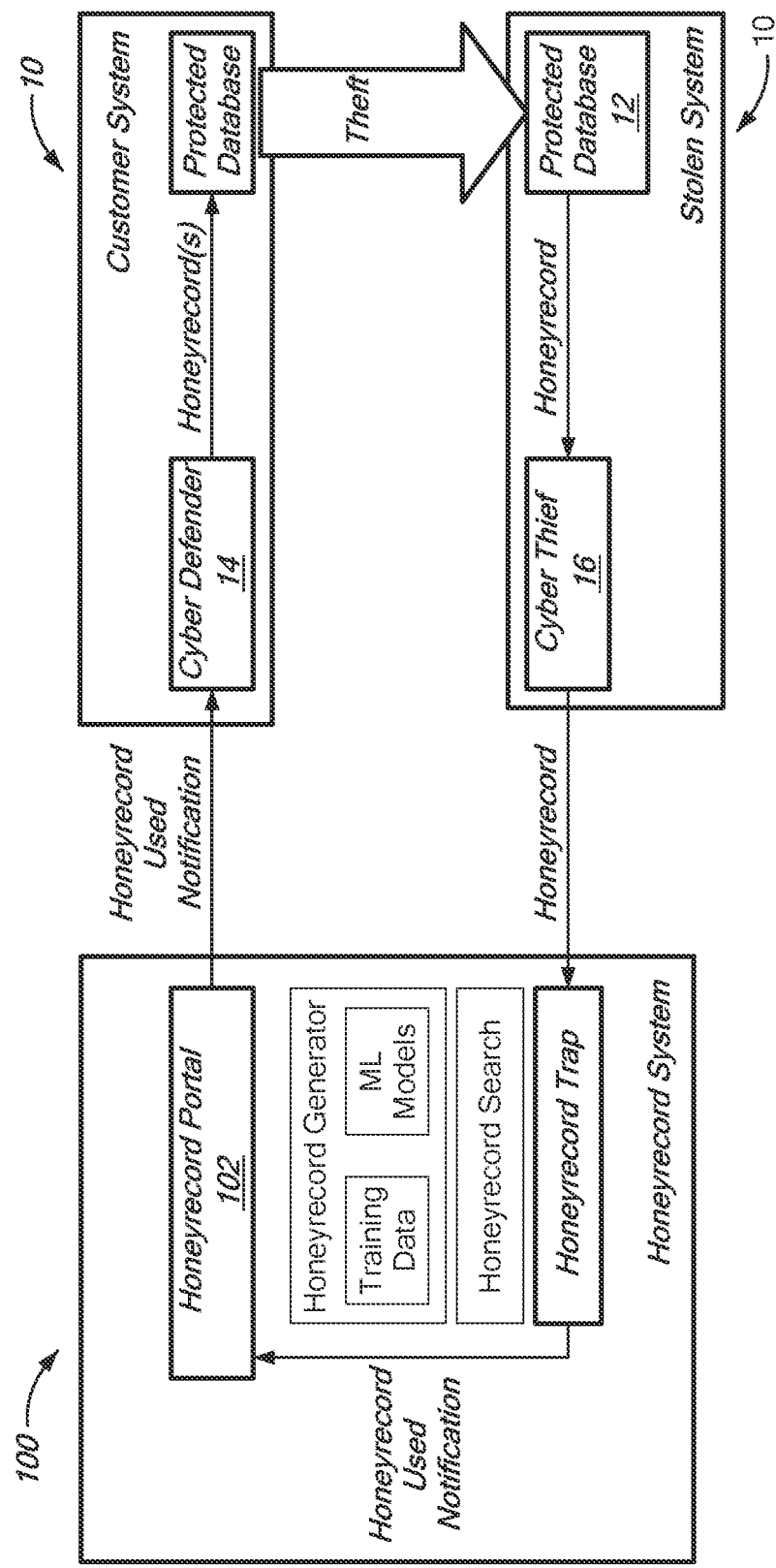
FIG. 7A is a schematic diagram of an exemplary embodiment of the system of FIG. 1 that is capable of detecting use of a stolen honeyrecord from the customer system.
Figure 7B:
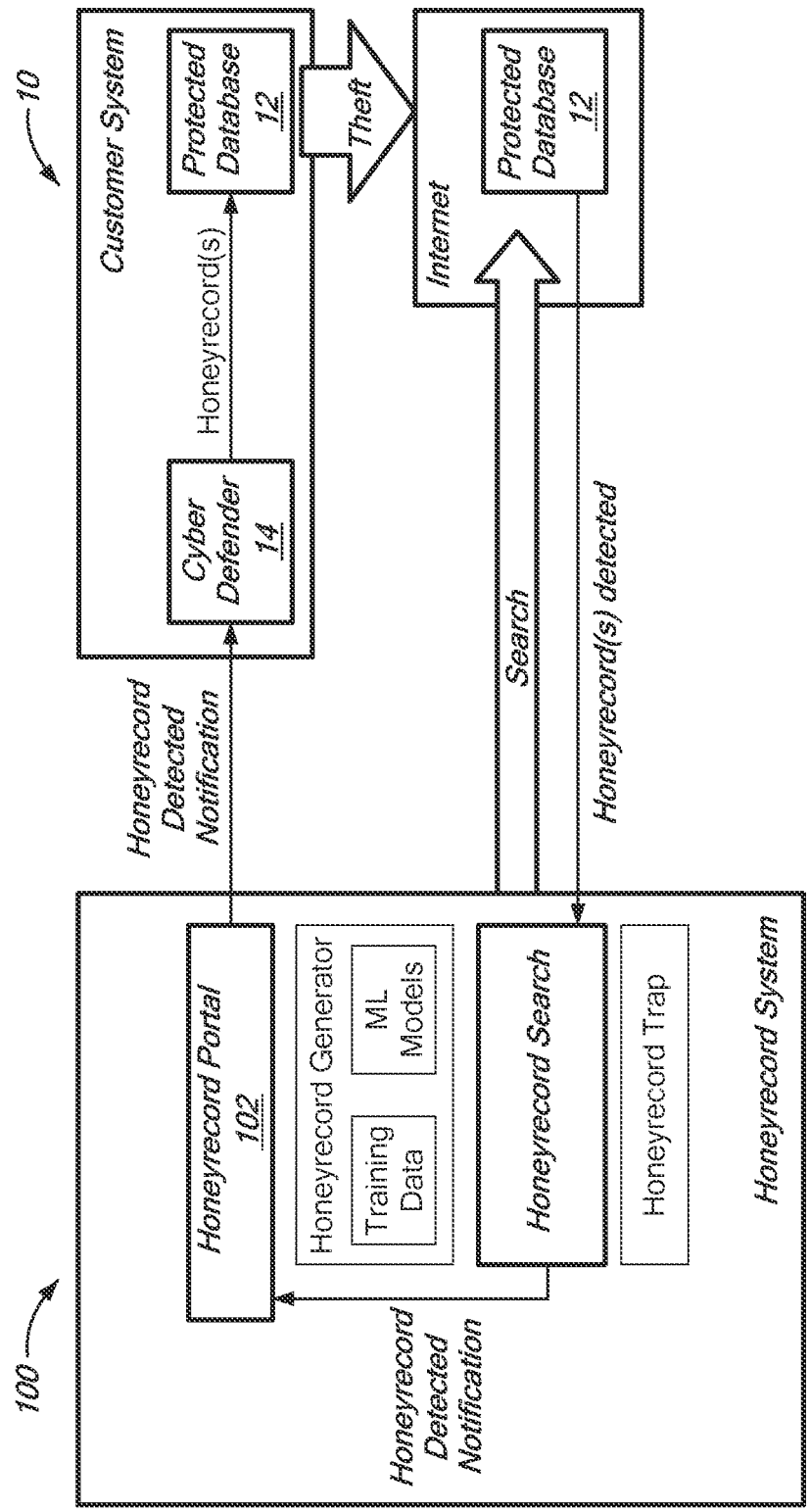
FIG. 7B is a schematic diagram of an exemplary embodiment of the system of FIG. 1 that is capable of detecting a presence of a stolen honeyrecord from the customer system by search.

FIGS. 7A-7B illustrate two exemplary methods of detection of stolen data that contains one or more of a honeyrecord and/or a honeytable therein in greater detail. While the methods are described here with respect to a honeyrecord, a person skilled in the art will recognize that these processes would also apply to honeytables and the discussion of honeytables are omitted herein for the sake of brevity.

As shown in FIG. 7A, the honeyrecord can act as a trap when the customer database 12 has been infiltrated and/or stolen by a cyber thief 16. For example, once the database and/or the data thereon is engaged with, the honeyrecord can send a notification of its use to the portal 102. Some non-limiting examples of honeyrecords that act as a trap can include honeyrecords having synthetic data parameters of email addresses, login credentials, credit card numbers, and so forth. Once the data in the honeyrecord is used, e.g., the email account is accessed, the login is used to attempt to access bank account or other private information, and/or a credit card number is used to attempt a purchase, this honeyrecord can alert the portal 102 of the breach which can allow the system administrator to determine the time, location, and extent of the breach based on the information that was stolen. A person skilled in the art will recognize that logs of the honeyrecord are kept within the system 100 and/or the customer system 10 to determine the time at which the honeyrecord was placed into the database to help narrow down when the breach occurred.

FIG. 7B illustrates an exemplary embodiment of detection of the presence of a stolen honeyrecord by search. The system 100 can periodically scan the internet, black market, and/or other sources known to one skilled in the art to locate a honeyrecord. If a honeyrecord is located following a search, this is evidence of a database being stolen and the system logs can be accessed to determine which data was taken, as well as the time, location, and extent of the breach.

Various embodiments may be implemented at least in part in any conventional computer programming language. For example, some embodiments may be implemented in a procedural programming language (e.g., "C"), or in an object oriented programming language (e.g., "C++"). Other embodiments may be implemented as a pre-configured, stand-along hardware element and/or as preprogrammed hardware elements (e.g., application specific integrated circuits, FPGAs, and digital signal processors), or other related components.

In an alternative embodiment, the disclosed system and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Further, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation, e.g., shrink wrapped software, preloaded with a computer system, e.g., on system ROM or fixed disk), or distributed from a server or electronic bulletin board over the network, e.g., the Internet or World Wide Web). In fact, some embodiments may be implemented in a software-as-a-service model ("SAAS") or cloud computing model. Of course, some embodiments may be implemented as a combination of both software, e.g., a computer program product, and hardware. Still other embodiments are implemented as entirely hardware, or entirely software.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, memristors, quantum computing devices, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The illustrated and described systems and methods are in no way limiting. A person skilled in the art, in view of the present disclosures, will understand how to apply the teachings of one embodiment to other embodiments either explicitly or implicitly provided for in the present disclosures. Further, a person skilled in the art will appreciate further features and advantages of the present disclosure based on the above-described embodiments. Accordingly, the disclosure is not to be limited by what has been particularly shown and described, except as indicated by the appended claims.

What is claimed is:

1. A system for creation of one or more honeyrecords, comprising:
  a server;
  a user portal;
  a target database having one or more real data sets that are attributed to a user identity stored thereon; and
  a honeytoken content generator that is configured to:
    generate a synthetic data set at a predetermined time interval, the synthetic data set having one or more of a combination of parameters from the one or more real data sets, or one or more parameters that resemble parameters of the one or more real data sets, the synthetic data set being unattributable to a user identity;
    insert one or more credential mechanisms into the synthetic data set such that the one or more credential mechanisms provide data about theft and/or misuse of the synthetic data set, the one or more credential mechanisms comprise one or more fake passwords created to be part of the synthetic data set; and
    deliver the synthetic data set to the database to be stored thereon, the synthetic data set being stored in a common location with the one or more real data sets;
  wherein the parameters of the synthetic data set include a user persona having one or more of a name, a sex, a date of birth, an email address, a telephone number, an employer, a job, a title, a physical address, a salary, a driver's license, a passport, a social security number, a login, bank account or credit card details, a photo or image or a virtual avatar, biometric details or a password, wherein:

the honeytoken content generator generates the synthetic data set in response to a honeyrecord request from the user portal;

the user portal can modify the parameters of the honeyrecord request sent from the user portal to determine the parameters of the synthetic data set;

the synthetic data set is created without referencing an aspect of the one or more real data sets stored on the database; and unauthorized access to the synthetic data set using the credential mechanism detected when unauthorized attempts are made to access the user portal using the one or more fake passwords.

2. The system of claim 1, wherein the synthetic data set is created without access or visibility into the database.

3. The system of claim 1, wherein the content generator creates the synthetic data set automatically at the predetermined time interval.

4. The system of claim 1, wherein the synthetic data set is created without user input.

5. The system of claim 1, wherein the synthetic data set stored at the common location is indistinguishable to an unauthorized user from the one or more real data sets stored at the common location.

6. The system of claim 5, wherein the common location comprises an existing target table within a database having the synthetic data and the one or more real data sets interspersed therein.

7. The system of claim 5, wherein the common location comprises a series of rows that create a honeytable having the synthetic data stored therein.

8. The system of claim 7, wherein each parameter in a row of the honeytable displays data that matches with at least one other parameter in the row of the honeytable.

9. The system of claim 7, wherein each parameter in a row of the honeytable displays data that matches with every other parameter in the row of the honeytable.

10. The system of claim 1, wherein each parameter of the user persona in the synthetic data set internally matches with each other parameter in the synthetic data set.

11. The system of claim 1, wherein the user portal is configured to modify the parameters of the synthetic data set created by the content generator.

12. The system of claim 1, wherein the parameters of the user persona in the synthetic data set do not match with each other parameter of the honeyrecord.

13. A system for creation of one or more honeyrecords, comprising:

a server;

a portal;

a target database having one or more real data sets that are attributed to a user identity stored thereon; and a honeytoken content generator that is configured to:

generate a synthetic data set at a predetermined time interval, the synthetic data set having one or more of a combination of parameters from the one or real data sets, or one or more parameters that resemble parameters of the one or real data sets, the synthetic data set being unattributable to a user identity;

insert one or more credential mechanisms into the synthetic data set, the one or more credential mechanisms comprise one or more fake passwords created to be part of the synthetic data set, such that data about unauthorized access to the synthetic data set using the credential mechanism detected when unauthorized attempts are made to access the user portal using the one or more fake passwords; and deliver the one or more synthetic data sets to the database to be stored thereon, the one or more synthetic data sets being stored in a common location with the one or real data sets;

wherein the parameters of the one or more synthetic data sets include a user persona having one or more of a name, a sex, a date of birth, an email address, a telephone number, an employer, a job, a title, a physical address, a salary, a driver's license, a passport, a social security number, a login, bank account or credit card details, a photo or image or a virtual avatar, biometric details or a password, wherein;

the honeytoken content generator generates the synthetic data set in response to a honeyrecord request from teh user portal;

the user portal can modify the parameters of the honeyrecord request sent from the user portal to determine the parameters of the synthetic data set; and the one or more synthetic data sets are created based on one or more database schema without referencing an aspect of the one or more real data sets.

14. The system of claim 13, wherein the one or more database schema includes column names or data types.

15. The system of claim 13, wherein the synthetic data set is created without access or visibility into the database.

16. The system of claim 13, wherein the synthetic data set created by the content generator is based on the one or more real data sets.

17. The system of claim 13, wherein the one or more database schema are chosen from a pre-generated parameter list on the portal.

* * * * *

UNITED STATES PATENT AND TRADEMARK OFFICE
CERTIFICATE OF CORRECTION

| | | |
|---|---|---|
| PATENT NO. | : 12,028,376 B2 | |
| APPLICATION NO. | : 17/169405 | |
| DATED | : July 2, 2024 | |
| INVENTOR(S) | : David Liebowitz et al. | |

It is certified that error appears in the above-identified patent and that said Letters Patent is hereby corrected as shown below:

In the Claims

At Column 20, Claim number 13, Line number 8, please add --more-- after "or" and before "real"

At Column 20, Claim number 13, Line number 10, please add --more-- after "or" and before "real"

At Column 20, Claim number 13, Line number 23, please add --more-- after "or" and before "real"

At Column 20, Claim number 13, Line number 34, please replace "teh" with --the--

Signed and Sealed this
Third Day of September, 2024

*Katherine Kelly Vidal*

Katherine Kelly Vidal
*Director of the United States Patent and Trademark Office*